Oct. 16, 1934.	F. E. TERMAN	1,976,904
LOSS METERING CIRCUIT
Filed March 27, 1931

INVENTOR,
FREDERICK E. TERMAN.
BY Donald H. Lippincott
ATTORNEY.

Patented Oct. 16, 1934

1,976,904

UNITED STATES PATENT OFFICE 1,976,904

LOSS METERING CIRCUIT

Frederick E. Terman, Stanford University, Calif.

Application March 27, 1931, Serial No. 525,636

4 Claims. (Cl. 175—183)

My invention relates to methods of measuring dielectric losses, or other effective resistances in alternating and particularly in high frequency oscillating circuits.

Among the objects of my invention are: First, to provide a method of high frequency resistance measurement whereby resistances may be read directly from a meter dial without the necessity for adjustment; second, to provide a method of dielectric loss measurement which is applicable to direct, continuous checking of quality along a strip of dielectric; third, to provide a method of dielectric measurement which is applicable to commercial processes such as the continuous measurement of moisture content in lumber; fourth, to provide a method of measurement wherein the quantity desired, whether it be power loss or resistance, may be read directly from a properly calibrated instrument without computation; and fifth, to provide a method of measurement which may be made substantially independent of frequency, and wherein the effect of changes of frequency, due to changes in dielectric constant which may be associated with changes in effective resistance, may be made negligibly small.

Other objects and advantages of my invention will become apparent or will be specifically pointed out in the course of this specification.

Referring to the drawing.

In general terms, the invention herein disclosed comprises converting direct current power into electrical oscillations, preferably by means of a vacuum tube oscillator of known type. The dielectric or other material whose losses are to be measured is subjected to these oscillations, which changes the amount of power absorbed from the D. C. source by the oscillator. This change in D. C. power is evaluated in terms either of the losses in the dielectric or conductor being measured, or in terms of its effective resistance, as the case may be. The preferred form of the invention depends upon the fact that a vacuum tube oscillator tends to maintain a constant voltage amplitude across its oscillating circuit regardless of the current flowing therein, if its source of direct current supply be maintained at a constant voltage. Losses introduced into the oscillating circuit increase the amount of power which must be supplied to it in order to keep its voltage oscillation at constant amplitude, and this power is derived directly from the D. C. circuit. Since the direct current voltage is constant, the power supplied from this circuit is directly proportional to the plate current. By properly designing the circuit constants, the ratio between the A. C. losses introduced by the sample which is being measured and the D. C. power supplying the oscillators, may be accurately predetermined, and for this reason a properly calibrated ammeter or milliammeter in the plate supply will give directly either the resistance of the sample or the power absorption caused by its introduction into the circuit.

Figure 1:
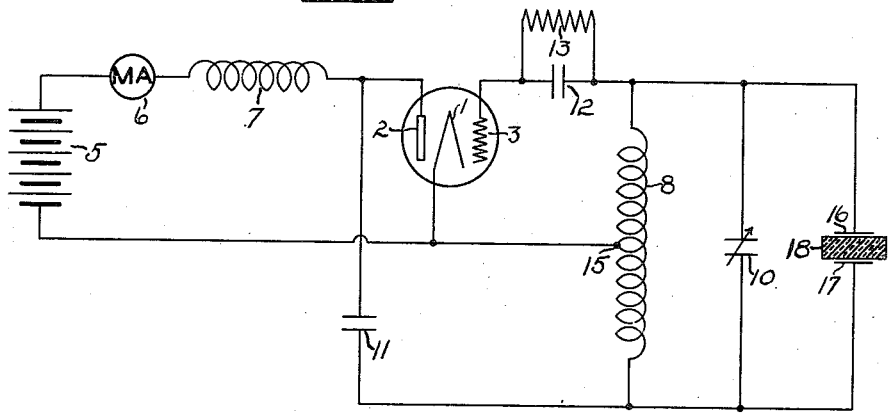
Figure 1 is a circuit diagram illustrating the method of applying this invention to the measurement of dielectric losses.

Considering the method in detail, Figure 1 shows the form of the circuit whereby it may be conveniently used for measuring dielectric losses. This circuit utilizes a known form of vacuum tube oscillator comprising a triode having a filament 1, plate 2, and grid 3. The filament circuit is omitted in the drawing for the sake of simplicity.

Power for the plate circuit is supplied by a battery or other source 5 which connects to the filament 1, and to the plate 2 through a milliammeter 6, and radio frequency choke coil 7. An oscillating circuit comprising an inductance 8 and condenser 10 connected in parallel, has one end connected to the plate through a blocking condenser 11. The other end of the oscillating circuit connects through a grid condenser 12, bridged by a grid leak 13, to the grid 3. A tap 15 intermediate the ends of the inductance 8 connects to the filament 1.

An additional pair of condenser plates 16, 17 are connected across the oscillating circuit, forming a condenser in parallel with the condenser 10. Between these plates is inserted the sample 18 of dielectric whose losses are to be measured. The nature of the plates 16, 17 depends upon the particular service for which the apparatus is designed; thus these plates may be so mounted above and below the track whereon lumber is run from a dry kiln, so that each successive board passing from the kiln must pass for its entire length between the plates. Paper or cloth dielectrics, which are made in long strips or sheets may be run between similarly positioned electrodes in a like manner, or small test plates may be used for measuring individual samples of dielectrics which are furnished for this specific purpose. Where the samples are all of substantially the same size, or where the measurements all fall within a narrow range, the condenser 10 may, if desired, be dispensed with, the entire capacity of the oscillating circuit being provided by the plates 16 and 17.

Figure 3:
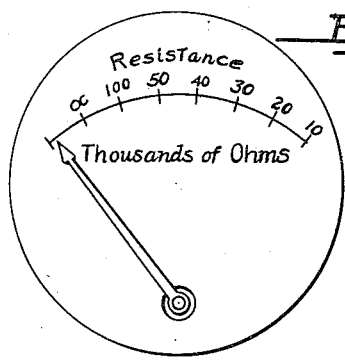
Figure 3 shows a meter calibrated in terms of the quantity to be measured, i. e., resistance.

Figure 3 shows a meter thus calibrated, the scale 19 reading in thousands of ohms resistance in the sample measure.

A properly designed oscillator of the character described will give a substantially sinusoidal alternating current voltage, whose peak value nearly equals the voltage of the D. C. source multiplied by a factor which is proportional to the ratio of transformation of the coil 8 considered as an auto transformer, and which is determined by the position on the coil of the tap 15.

When the circuit is operated without the sample 18 between the test plates 16 and 17, the milliammeter 6 will indicate a current which is proportional to the total losses in the oscillator. When the sample 18 is inserted, these losses will increase, and a greater current will be drawn. The increase in plate current multiplied by the voltage of the source 5 gives the loss in watts occasioned by inserting the dielectric in the circuit, and from this loss the resistance of the dielectric may be deduced in a straight forward manner.

The increased D. C. losses as indicated by the milliammeter are not wholly chargeable to the losses introduced into the oscillating circuit, but depend also upon the adjustment of the oscillator, but in any case the power supplied to the oscillator bears a fixed relation to the losses added to the circuit.

For any given oscillating circuit and type of tube a curve may be constructed showing the relations between plate current increment and sample loss which is sufficiently accurate for most purposes, but for extreme accuracy point by point calibration of the milliammeter scale should be resorted to. The scale may, of course, be calibrated to show either effective resistance of the sample or the loss in the sample.

The introduction of the sample will, in general, change the frequency of oscillation of the circuit. Known principals of design of the coil 8 will, however, enable a circuit to be made whose losses are substantially independent of the frequency of oscillation, and wherein the plate current is therefore substantially unchanged by mere frequency variations. In the few cases where this method is not sufficiently accurate, the condenser 10 may be varied to return the frequency of oscillation to its original value after the sample has been introduced, thereby insuring that the increase in losses shown by the D. C. measurement is actually that due to the losses in the sample, the effect not being complicated by changed losses in the circuit due to frequency change.

Figure 2:
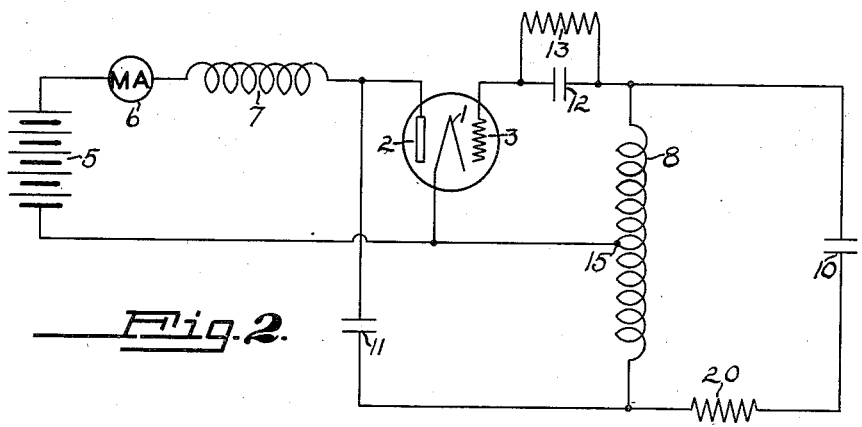
Figure 2 is a similar diagram showing the method of applying the invention to the measurement of resistance of conductors.

Figure 2 illustrates the method of introducing a conductive sample 20 into the circuit shown in Figure 1. In this case the auxiliary condenser plates 16 and 17 are dispensed with, and the sample 20 is inserted directly in the oscillating circuit between the coil 8 and the condenser 10. The increased loss in the oscillating circuit is shown by the milliammeter 6, in precisely the same manner as though these losses occurred in a dielectric. In this case, as before, the milliammeter may be calibrated to read either in terms of loss or in terms of resistance. In this case, however, there is no necessity for compensating for variation of frequency caused by the introduction of the sample, since this will usually be so small as to have no appreciable effect.

It will be obvious that various known forms of oscillator may be substituted for that shown in the drawing, and that other substitutions and modifications may be made by those skilled in the art. Therefore I do not limit myself to the precise form of the invention as here described, but reserve the right to variant forms within the scope of the following claims.

I claim:

1. The method of measuring effective A. C. resistance which comprises converting D. C. power into oscillating power, subjecting the sample whose resistance is to be measured to the oscillations thus produced, and evaluating the resistance from the increase in D. C. power required to maintain said oscillations in said sample.

2. The method of measuring effective A. C. resistance which comprises converting D. C. power of substantially constant voltage into oscillations of substantially constant potential amplitude, subjecting the sample whose resistance is to be measured to said oscillations, and evaluating the resistance of said sample from the increase of direct current required to maintain said oscillations in said sample.

3. In an apparatus for measuring a function of the A. C. power loss in a sample, a vacuum tube oscillator having an oscillating output circuit associated therewith, means for connecting the sample to be measured in said circuit, a source of D. C. plate power for said oscillator, and a meter in said circuit calibrated in terms of the function to be measured.

4. The method of measuring a quantity which is a function of the effective A. C. resistance of a body which comprises converting D. C. power into oscillations, utilizing said oscillations to establish an electric field, establishing a condition of resonance to produce maximum energy in said field, introducing said body into said field, reestablishing the resonant condition, and evaluating the quantity to be measured from the increase in D. C. power required to maintain said oscillations in said body.

FREDERICK E. TERMAN.